United States Patent [19]

Sakano

[11] Patent Number: 4,503,374
[45] Date of Patent: Mar. 5, 1985

[54] SPEED DETECTION APPARATUS AND METHOD

[75] Inventor: Tetsuro Sakano, Hachioji, Japan

[73] Assignee: Fanuc Ltd., Minamitsuru, Japan

[21] Appl. No.: 514,315

[22] Filed: Jul. 15, 1983

[30] Foreign Application Priority Data

Jul. 15, 1982 [JP] Japan .................. 57-123284

[51] Int. Cl.³ .......................................... G05B 5/01
[52] U.S. Cl. ................................. 318/616; 318/561; 318/603
[58] Field of Search ............... 318/603, 616, 615, 603

[56] References Cited

U.S. PATENT DOCUMENTS

| | | | |
|---|---|---|---|
| 3,829,785 | 8/1974 | Schroder et al. | 328/130 |
| 3,892,952 | 7/1975 | Shibata et al. | 235/151.32 |
| 4,295,171 | 10/1981 | Hirota | 318/603 X |
| 4,315,200 | 2/1982 | Yamada | 318/603 |
| 4,376,914 | 3/1983 | Kimura | 318/607 X |

FOREIGN PATENT DOCUMENTS

| | | |
|---|---|---|
| 2750157 | 5/1978 | Fed. Rep. of Germany . |
| 2949131 | 6/1981 | Fed. Rep. of Germany . |
| 0059433 | 9/1982 | Japan . |

*Primary Examiner*—B. Dobeck
*Attorney, Agent, or Firm*—Staas & Halsey

[57] ABSTRACT

Disclosed are a method and apparatus for providing speed information based on position pulses from a position detector for the purpose of controlling the speed of a motor. The invention includes a circuit for receiving the position pulses, and for counting the number N of pulses within a fixed period To. Measuring an interval T1 between a position pulse generated just prior to the fixed period To and the instant at which the period To begins and for measuring an interval T2 between the final position pulse generated in the period To and the instant at which the period To ends. The operation T=To+T1−T2 is performed to obtain the time T required for input of the position pulses, the time T is divided by the number N of pulses, and speed information V is obtained by performing the operation V=K·N/T, where K is a proportional constant.

9 Claims, 3 Drawing Figures

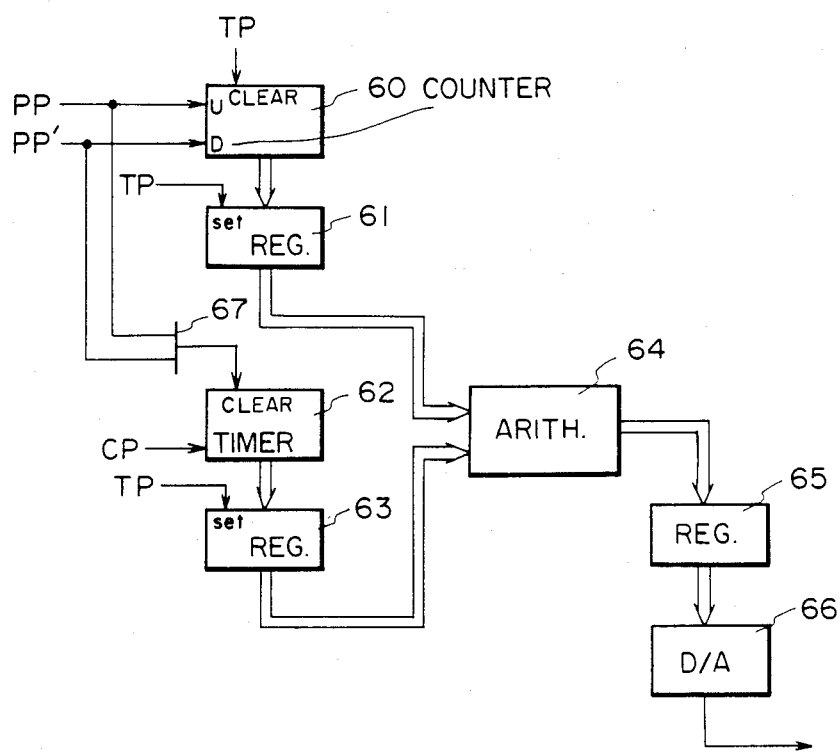

SPEED DETECTION APPARATUS AND METHOD

BACKGROUND OF THE INVENTION

This invention relates to a speed detection apparatus and method for detecting speed information using position pulses obtained from a position detector. More particularly, the invention relates to a speed detection apparatus and method wherein speed can be detected with great accuracy over a wide range.

Controlling the speed of an A.C. or D.C. motor requires that the actual motor speed be detected and compared with a commanded speed. FIG. 1 is a block diagram of a common servo control system. A servo motor 1 has a rotary encoder (position detector) 2 connected directly to its rotary shaft for producing position pulses PP, each of which is generated whenever the motor rotates by a predetermined amount. The pulses PP are applied to an arithmetic circuit 3, which proceeds to compute the difference between the number of pulses PP generated and a number of position command pulses PCMD obtained from an external unit, the computed difference being stored in an error register 4. The digital data within the error register 4 is converted into an analog voltage by a digital-to-analog converter (D/A) 5, and the resulting voltage is applied as a speed command voltage to a speed control circuit 7. Meanwhile, using the position pulses PP from the rotary encoder 2, a speed detecting circuit 6 detects the actual speed of the motor 1 and provides the speed control circuit 7 with a voltage equivalent thereto. The speed control circuit 7 controls the speed of the servomotor 1 based on the difference between the speed command voltage and the voltage signal corresponding to the actual speed. In a servo control operation for performing control based on speed feedback in the above-described manner, the accuracy of speed feedback control depends upon the speed detecting precision of the speed detecting circuit 6. The accuracy of speed detection is therefore extremely important in servo control.

A speed detection apparatus heretofore available in the art has a position detector for generating two signals displaced in phase from each other by $\pi/2$ and having a frequency f proportional to the rotational speed of the motor. The two-phase signals are converted into signals of a frequency 4 f by means of a quadrupling circuit. Finally, a frequency-to-voltage converter generates a voltage proportional to the frequency 4 f, that is, a voltage (actual speed voltage) proportional to the rotational speed of the motor.

A problem encountered in the foregoing prior-art arrangement is that, when the motor speed drops to a low value, the magnitude of the voltage signal produced by the frequency-to-voltage converter no longer remains proportional to the rotational speed of the motor but instead exhibits a sudden decline which diminishes the accuracy of measurement. Accordingly, rather than relying upon a frequency-to-voltage conversion, methods of detecting speed by digital processing using a microcomputer have been proposed to increase accuracy at a reasonable cost in view of LSI techniques.

One such method performs detection by counting position pulses applied within a fixed period of time and then treating a value proportional to the counted value as speed information. When the fixed period is shortened, however, the number of pulses applied within said period diminishes so that there is a decline in the accuracy of speed detection. This makes it necessary to lengthen the period. However, a longer period also lengthens detection time, thereby detracting from the accuracy and response of the speed detection system.

A second detection method performs detection by monitoring the interval (i.e., period) between position pulses and then treating the reciprocal of the interval as speed information. However, the period of the position pulses shortens at high-speed rotation so that it becomes difficult to measure the period accurately under such conditions.

SUMMARY OF THE INVENTION

Accordingly, an object of the present invention is to provide a speed detection apparatus and method by which speed can be detected in a short time and with great accuracy.

Another object of the present invention is to provide a speed detection apparatus and method which allow use of a circuit arrangement, comprising counters, registers and arithmetic circuitry, which is well-suited to the application of LSI techniques.

A further object of the present invention is to provide a speed detection apparatus and method wherein a minimum of only two counters need be provided, resulting in an apparatus having simple and inexpensive construction.

According to the present invention, the foregoing objects are attained by providing a system for detecting speed information based on position pulses from a position detector for the purpose of controlling the speed of a motor. The speed detection method used by the system includes receiving the position pulses counting the number n of pulses within a fixed period To, measuring an interval T1 between a position pulse generated just prior to the fixed period To and the instant at which the period To begins, and measuring an interval T2 between the final position pulse generated in the period to and the instant at which the period To ends. The operation $T = To + T1 + T2$ is performed to obtain the time T during which the position pulses were received the time T is divided by the number n of pulses, and speed information V is obtained by performing the operation $V = K \cdot N/T$, where K is a proportional constant.

Other features and advantages of the present invention will be apparent from the following description taken in conjunction with the accompanying drawings.

BRIEF DESCRIPTION OF THE DRAWINGS

FIG. 3 is a block diagram of an embodiment of a speed detection apparatus according to the present invention.

DESCRIPTION OF THE PREFERRED EMBODIMENT

Figure 1:
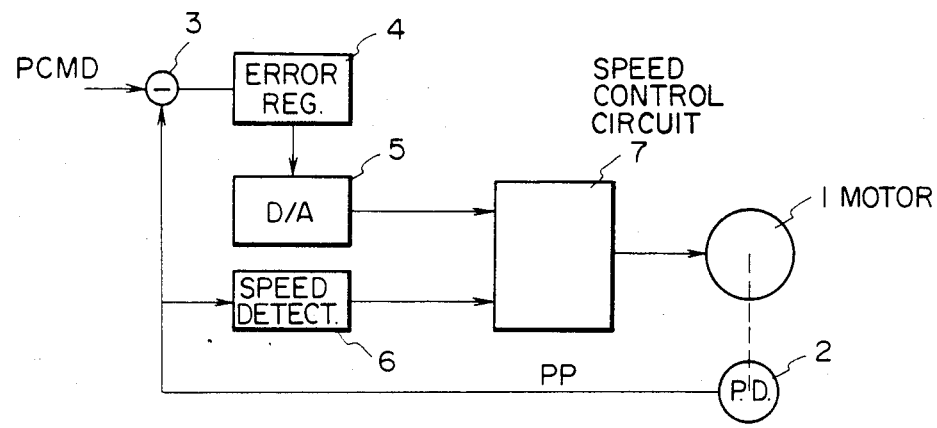
FIG. 1 is a block diagram of a common servo control system according to the prior art.
Figure 2:
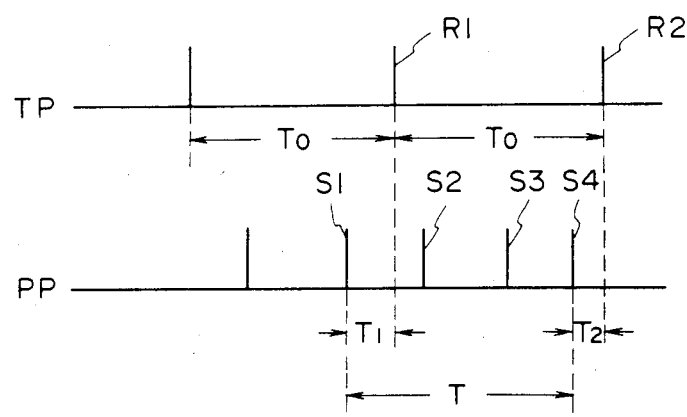
FIG. 2 is a timing diagram of pulse timing useful in describing the principle of the present invention.

With reference to FIG. 2, TP represents reference pulses of a fixed period To, such as 0.5 msec. Position pulses PP are produced by a position detector 2 (FIG. 1). According to the present invention, first, the number N of position pulses PP received during the period To are counted. Then, an interval T1 is measured, namely the time between a position pulse S1 which occurs just prior to the onset of the measurement period, and the start of the measurement period, namely the instant at which a reference pulse R1 is generated. Next, an interval T2 is measured, this being the time between a position pulse S4, which is the last position pulse in the measurement period, and the generation of the reference pulse R2. Then, using the values obtained from these measurements, a length of time T required for the application of N position pulses PP is computed from the following:

$$T = To + T1 - T2 \qquad (1)$$

where To is the fixed period, which is a known quantity. If the time T is divided by the counted pulse number N, the result will be the average period for one position pulse, and the reciprocal of this period will be the position pulse frequency, namely speed information. Therefore, letting V represent the rotational speed of the motor, V will be obtained from the following:

$$V = K \cdot N / T \qquad (2)$$

where K is a proportional constant.

Thus, the invention shortens a fixed period To to a value of, e.g., 0.5 msec., and computes the average value of the periods of the position pulses PP in one of the fixed period To. This solves the problem of measurement accuracy at low speed as encountered with the first detection method, and eliminates a decline in measurement accuracy in the high speed region, which occurs using second detection method.

FIG. 3 is a block diagram illustrating an embodiment of the present invention. Numeral 60 denotes an up/down counter which is incremented by forward rotation position pulses PP from the rotary encoder 2 (FIG. 1) and decremented by reverse rotation position pulses PP' from the rotary encoder, the counter being cleared by a reference pulse TP. The output of the up/down counter 60 is connected to the input of a first register 61, in which the value of the count from the counter 60 is stored in response to the reference pulse TP. A timer counter 62 counts clock pulses CP and has its contents cleared by either of the position pulses PP or PP', which are applied to an OR gate 67. The output of the timer counter 62 is connected to the input side of a second register 63, in which the value of the count from the timer counter 62 is stored in response to the reference pulse TP. Numeral 64 designates an arithmetic circuit comprising a microprocessor which produces a speed information signal by executing the operations of Eqs. (1) and (2) using the contents of the first register 61 and second register 63. The output of the arithmetic circuit 64 is applied to a third register 65 for temporarily storing the speed information acquired from the arithmetic circuit 64. A digital-to-analog (D/A) converter 66 converts the contents of the third register 65 into an analog value.

In operation, assume that the motor is rotating in the forward direction so that the position pulses are the forward rotation pulses PP. The timer counter 62 counts the clock pulses CP and is cleared by each of the position pulses PP applied thereto via the OR gate 67. Meanwhile, the value of the count within the timer counter 62 is stored in the second register 63 in response to each of the reference pulses TP. Therefore, at the instant the reference pulse R1 (FIG. 2) is received by the second register 63, the second register 63 is set to a counted value T1 that is equivalent to the interval between a position pulse S1 and the reference pulse R1.

The arithmetic circuit 64 reads the counted value T1 and stores the value T1 in an internal memory. The up/down counter 60 is incremented by the position pulses PP and has its contents cleared by each of the reference pulses TP. The counter 60 therefore counts the number of position pulses PP during the period To of the reference pulses TP, the value of the count being stored in the first register 61 in response to each of the reference pulses TP. Meanwhile, as described above, the timer counter 62 counts the clock pulses CP and is cleared by each of the position pulses PP, but the value of the count is not stored in the second register 63 until one of the reference pulses TP arrive. When the reference pulse R2 is produced, the value of the count in the timer counter 62 is stored in the second register 63. This value, represented by T2, corresponds to the interval between the position pulse S4 and a reference pulse R2, as illustrated in FIG. 2. The arithmetic circuit 64 reads the counted value T2 from the second register 63, and computes the input time T by executing the operation of Eq. (1) using the known period To as well as the previously counted value T1 stored in the internal memory. The arithmetic circuit 64 then accesses the first register 61 and reads the number N of position pulses PP produced in the period To extending from the reference pulse R1 to the reference pulse R2, and proceeds to obtain the speed information V by executing Eq. (2). The speed information V is stored in the third register 65 and is subsequently converted into an analog value by the DA converter 66. The analog value is then delivered to the speed control circuit 7 illustrated in FIG. 1. It should be noted that the DA converter 66 may be dispensed with if the speed control circuit 7 is to receive the speed information in digital form.

The operation is quite similar for reverse rotation of the motor. In such a case, the up/down counter 60 will be decremented by the position pulses PP' and deliver a negative counted value N to the arithmetic circuit 64. This will provide speed information for reverse motor rotation.

In accordance with the present invention as described and illustrated hereinabove, the speed detection apparatus includes the up/down counter 60 for counting the number N of position pulses PP applied thereto within the fixed period To, and a measurement circuit for measuring the time T required for the entry of the number N of position pulses PP, and produces speed information based on a value obtained by dividing the number N of position pulses PP by the measured time T. This arrangement makes possible rapid and very precise speed detection, and is particularly effective in improving the detection accuracy at high rotational speeds. Further, according to the invention, the foregoing advantages can be achieved by a circuit arrangement, consisting of the counters, registers and arithmetic circuitry, which is well-suited to the application of LSI techniques. In addition, a minimum of only two counters are required, so that the circuit arrangement is simple and low in cost.

As many apparently widely different embodiments of the present invention can be made without departing from the spirit and scope thereof, it is to be understood that the invention is not limited to the specific embodiments thereof except as defined in the appended claims.

What we claim is:

1. A speed detection apparatus for a motor, in which a position detector generates position pulses and an actual speed V of the motor is detected from the position pulses generated by the position detector operatively connected to the motor, and the actual speed is compared with a commanded speed in order to control the motor, said apparatus comprising:

means, operatively connected to the position detector to receive the position pulses, for counting a number of the position pulses received within a fixed period To;

means, operatively connected to the position detector, for measuring a first interval T1 between a prior position pulse generated just prior to the fixed period To and an instant at which the fixed period begins;

means, operatively connected to the position detector, for measuring a second interval T2 between a final position pulse generated in the fixed period To and an instant at which the fixed period ends;

means, operatively connected to said counting means, said first interval measuring means and said second interval measuring means, for obtaining a time T required for input of the position pulses within the fixed period by performing an operation $T = To + T1 - T2$; and means, operatively connected to said time obtaining means, for dividing the time T by the number of position pulses, and for detecting the actual speed V by performing an operation $V = K \cdot N/T$, where K is a proportional constant.

2. An apparatus according to claim 1, wherein said counting means comprises a counter operatively connected to the position detector and said time obtaining means.

3. An apparatus according to claim 1, wherein said first interval measuring means comprises a timer counter operatively connected to said time obtaining means.

4. An apparatus according to claim 1, wherein said second interval measuring means comprises a timer counter operatively connected to said time obtaining means.

5. An apparatus according to claim 1, wherein said time obtaining means comprises an arithmetic circuit operatively connected to said counting means, said first and second interval measuring means and said time dividing means.

6. An apparatus according to claim 1, wherein said time dividing means comprises an arithmetic circuit operatively connected to said time obtaining means.

7. A speed detection method in which an actual speed of a motor is detected from position pulses generated by a position detector operatively connected to the motor, and the actual speed is compared with a commanded speed in order to control the motor, said method comprising the steps of:

(a) counting a number of the position pulses generated within a fixed period;

(b) measuring an input time required for input of the number of the position pulses;

(c) dividing the number of the position pulses by the input time to obtain a quotient; and (d) indicating the actual speed based on the quotient obtained in step (c).

8. A speed detection method according to claim 7, wherein the fixed period has a beginning and an end, and wherein said step (b) comprises the substeps of:

(bi) measuring a first time interval between a prior position pulse, generated immediately before the beginning of the fixed period, and the beginning of the fixed period;

(bii) measuring a second time interval between a final position pulse, generated immediately prior to the end of the fixed period, and the end of the fixed period; and (biii) calculating the input time by adding the first time interval to the fixed period and subtracting the second time interval.

9. An apparatus for detecting an actual speed of a motor using position pulses generated by a position detector operatively connected to the motor, said apparatus comprising:

counting means, operatively connected to the position detector, for counting a number of the position pulses received within a fixed time period having a beginning and an end;

time measuring means, operatively connected to the position detector, for measuring a first time interval between a prior position pulse, generated immediately prior to the beginning of the fixed time period, and the beginning of the fixed time period, and a second time interval between a final position pulse, generated immediately prior to the end of the fixed time period, and the end of the fixed time period; and calculating means, operatively connected to said counting means and said time measuring means, for calculating an input time by adding the first time interval to the fixed time period and subtracting the second time interval, and for detecting the actual speed by multiplying the number of the position pulses by a proportional constant and dividing by the input time.

* * * * *

UNITED STATES PATENT AND TRADEMARK OFFICE
CERTIFICATE OF CORRECTION

PATENT NO. : 4,503,374
DATED : March 5, 1985
INVENTOR(S) : Sakano

It is certified that error appears in the above-identified patent and that said Letters Patent is hereby corrected as shown below:

[57] ABSTRACT, line 6, "Measuring" should be --Another circuit is included for measuring--.

Col. 2, line 34, "pulses" should be --pulses,--;
line 35, "n" should be --N--;
line 39, "to" should be --To--;
line 42, "received" should be --received,--;
line 43, "n" should be --N--.

Col. 4, line 13, "arrive" should be --arrives--;
line 17, "a" should be --the--.

Signed and Sealed this

Twenty-seventh Day of August 1985

[SEAL]

Attest:

DONALD J. QUIGG

Attesting Officer     Acting Commissioner of Patents and Trademarks